(12) United States Patent
Shen

(10) Patent No.: US 7,164,635 B2
(45) Date of Patent: Jan. 16, 2007

(54) METHOD OF ESTIMATION PARAMETER ADAPTABILITY ADJUSTMENT OF AN OPTICAL STORAGE DEVICE

(75) Inventor: Yung-Chi Shen, Taipei (TW)

(73) Assignee: MediaTek Incorporation, Hsin-Chu Hsien (TW)

( * ) Notice: Subject to any disclaimer, the term of this patent is extended or adjusted under 35 U.S.C. 154(b) by 350 days.

(21) Appl. No.: 10/711,210

(22) Filed: Sep. 1, 2004

(65) Prior Publication Data

US 2005/0058049 A1    Mar. 17, 2005

(30) Foreign Application Priority Data

Sep. 15, 2003    (TW) .............. 92125405 A

(51) Int. Cl.
    G11B 19/00    (2006.01)
(52) U.S. Cl. ................ 369/47.46; 369/47.18; 369/30.01; 369/53.3
(58) Field of Classification Search ............. None
    See application file for complete search history.

(56) References Cited

U.S. PATENT DOCUMENTS

| | | | | |
|---|---|---|---|---|
| 5,689,482 A | * | 11/1997 | Iida ........................ | 369/30.1 |
| 5,963,608 A | * | 10/1999 | Casper et al. ............... | 375/373 |
| 6,034,998 A | * | 3/2000 | Takashi et al. ............. | 375/294 |
| 6,694,089 B1 | * | 2/2004 | Shim et al. .................. | 386/70 |
| 6,788,485 B1 | * | 9/2004 | Ashley et al. ................ | 360/51 |
| 6,809,896 B1 | * | 10/2004 | Espeseth et al. ......... | 360/78.07 |
| 2002/0021519 A1 | * | 2/2002 | Rae ........................... | 360/51 |

FOREIGN PATENT DOCUMENTS

JP    03116472 A    *    5/1991

* cited by examiner

Primary Examiner—Thang V. Tran
(74) Attorney, Agent, or Firm—Winston Hsu

(57) ABSTRACT

A method of estimation parameter adaptability adjustment of an optical storage device. The method determines an estimation parameter according to a current data recording location of the optical storage device to estimate a channel bit rate. The method includes providing a two-dimensional estimation parameter table. The two-dimensional estimation parameter table includes a plurality of estimation parameters corresponding to linear velocities and data recording locations. The method further includes determining a linear velocity estimation value; and determining the estimation parameter according to the linear velocity estimation value, the current data recording location, and the two-dimensional estimation parameter table to estimate the channel bit rate.

15 Claims, 5 Drawing Sheets

METHOD OF ESTIMATION PARAMETER ADAPTABILITY ADJUSTMENT OF AN OPTICAL STORAGE DEVICE

BACKGROUND

The invention generally relates to a method for adjusting estimation parameters of an optical storage device, and more particularly, to a method of estimation parameter adaptability adjustment of an optical storage device.

Following the increase in calculation speed of computer systems and the progression of internet, the requirement for data storage of different computer users increases accordingly. Due to the compact size, impressive storage capacity, and economical cost of an optical storage medium such as a compact disc (CD) or a digital versatile disc (DVD), an optical storage device such as a CD drive, a CD burner, a DVD drive, or a DVD burner for accessing the optical storage medium has become a standard accessory of computer systems.

Regarding the above-mentioned requirement, new CD/DVD specifications of larger storage capacity and prolonged recording time are introduced with a linear velocity up to 1.1 m/sec. However, when the recording time is greatly increased, the linear velocity will significantly deviate from a typical value of 1.3 m/sec of original specifications known in the art. In the optical storage device according to the related art, the deviation in linear velocity seriously affects parameter settings related to the channel bit rate. Therefore, the optical storage device cannot simultaneously satisfy the original specifications of conventional optical storage media and the new specifications of new popular optical storage media. For example, if a setting value of VCODAC setting is not accurate, a frequency of a clock signal generated by a voltage-controlled oscillator (VCO) of the optical storage device cannot approach to a current channel bit rate so that a phase-locked loop (PLL) within the optical storage device cannot instantly lock onto the current channel bit rate. Therefore, the PLL cannot effectively operate.

In the optical storage device according to the related art, the parameter settings related to the channel bit rate are usually implemented by setting specific parameters or according to real-time and simple calculation results. However, regarding the adaptability of the optical storage device with respect to the optical storage media, complex mathematical calculations for the parameter settings are required. Therefore, in operation processes of the optical storage device, there is not enough time for such complex mathematical calculations and not enough information to perform adaptability adjustment to enhance the performance of the optical storage device.

SUMMARY

It is therefore an objective of the claimed invention to provide a method of estimation parameter adaptability adjustment of an optical storage device to solve the above-mentioned problem.

The present invention provides a method of estimation parameter adaptability adjustment of an optical storage device. The method determines an estimation parameter according to a current data recording location of the optical storage device to estimate a channel bit rate. The method includes providing a two-dimensional estimation parameter table. The two-dimensional estimation parameter table includes a plurality of estimation parameters corresponding to linear velocities and data recording locations. The method further includes determining a linear velocity estimation value; and determining the estimation parameter according to the linear velocity estimation value, the current data recording location, and the two-dimensional estimation parameter table to estimate the channel bit rate.

An advantage of the present invention is that the two-dimensional estimation parameter table is designed according to the plurality of linear velocities of data recording and the data recording locations so that the estimation parameters of the two-dimensional estimation parameter table comply with the accuracy needed for different optical storage media being read at different linear velocities of data recording by the optical storage device. As a result, a frequency of a clock signal generated by a voltage-controlled oscillator (VCO) of the optical storage device may approach to a current channel bit rate so that a phase-locked loop (PLL) within the optical storage device can instantly lock onto the current channel bit rate to release the full potential of the PLL. On the other hand, after a seeking operation, the time that an IC of the optical storage device locks on the channel bit rate is reduced.

Another advantage of the present invention is that the two-dimensional estimation parameter table is designed according to the plurality of linear velocities of data recording and the data recording locations so that the estimation parameters of the two-dimensional estimation parameter table can compensate for the accuracy needed for some optical storage media having comparatively larger linear velocity deviations of data recording.

Another advantage of the present invention is that the present invention creates in advance the estimation parameter table having an adaptability adjustment function using the plurality of estimation parameters derived from complex mathematical calculations corresponding to the adaptability of the optical storage device with respect to the optical storage media. Therefore, when the optical storage device is in operation, parameter settings related to the channel bit rate is instantly obtained along with enough information to perform adaptability adjustment to enhance the performance of the optical storage device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
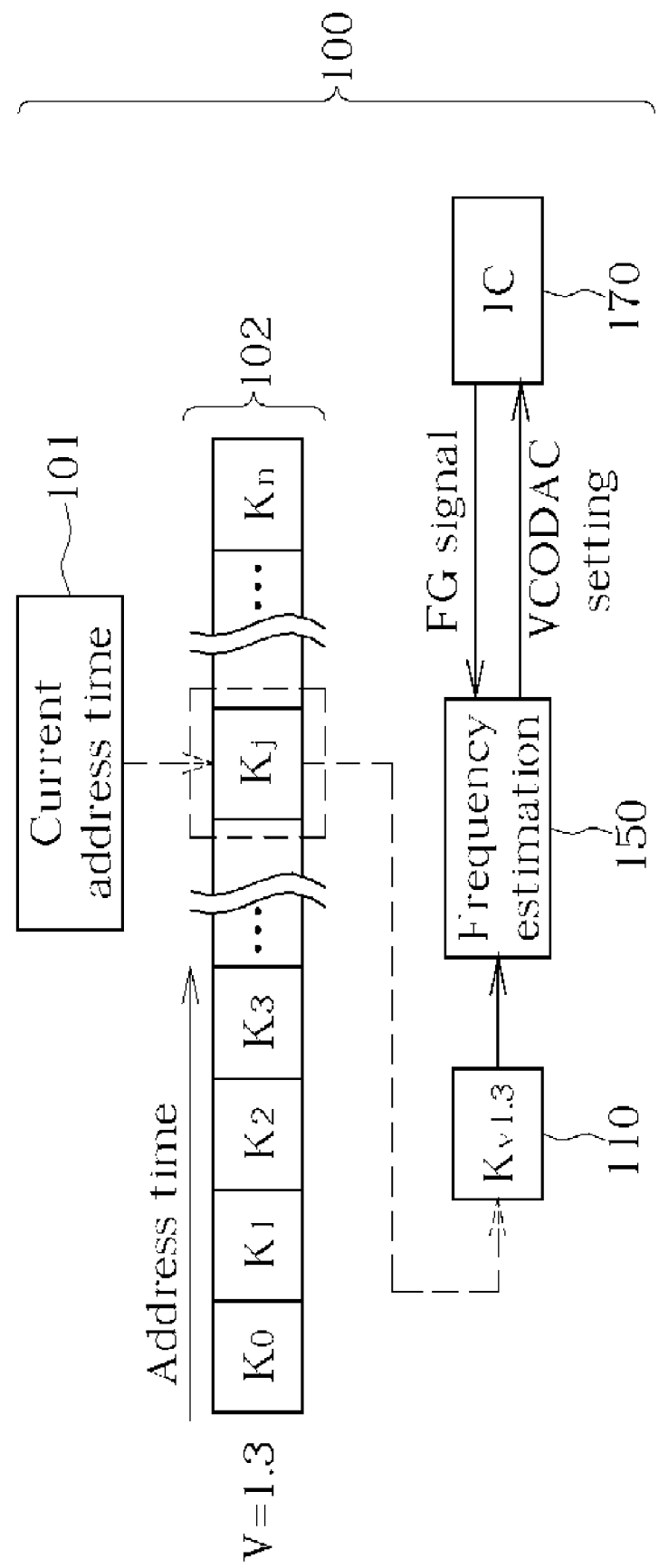
FIG. 1 is a diagram of a model used for a method of estimation parameter adjustment of an optical storage device according to one embodiment of the present invention.

An optical storage medium known in the art includes a spiral track for data recording. According to the spiral track formula derived from fundamental calculus theorems, the relationship between the data recording location L of the optical storage medium and the radius R of the optical storage medium is defined as $$R = \sqrt{r_i^2 + \frac{p \times L}{\pi}}$$

wherein $r_i$ is the radius of the inner track starting point, where L is zero, p is the track pitch, which is the radial distance between two consecutive tracks, and π is the ratio of the circumference of a circle to its diameter.

Using a DVD as an example, the data recording locations are defined in units of sectors and each sector has a track length of 5.1584 mm. For the $T^{th}$ sector in the DVD, the data recording location L is 5.1584 T, and the corresponding radius R is $$R = \sqrt{r_i^2 + \frac{5.1584 \times p \times T}{\pi}}$$

wherein the radius $r_i$ of the inner track starting point of the DVD is 24 mm, and the track pitch p is 0.74 µm.

Using a CD as an example, the data recording locations are defined in units of seconds and the track length for each second ranges from 1.2 m to 1.4 m (i.e. the linear velocity ranges from 1.2 m/sec to 1.4 m/sec). The data recording location L for the $T^{th}$ second ranges from 1.2 T to 1.4 T and the corresponding radius R is $$R = \sqrt{r_i^2 + \frac{1.2 \times p \times T}{\pi}} \sim \sqrt{r_i^2 + \frac{1.4 \times p \times T}{\pi}}$$

wherein the radius $r_i$ of the inner track starting point of the CD is 25 mm, and the track pitch p is 1.6 µm.

The relationship among the linear velocity V, radius R, rotational frequency f, whose unit is "1/sec" (i.e. revolutions per second), and angular velocity ω on the spiral track of the aforementioned optical storage medium is defined by $$V = R \times \omega = 2 \times \pi \times R \times f$$

Therefore, the channel bit rate υ of an optical storage device when accessing the optical storage medium is $$\upsilon = \frac{V}{\varepsilon} = \frac{R \times \omega}{\varepsilon} = \frac{2 \times \pi \times R \times f}{\varepsilon}$$

wherein ε is the length of a bit in the optical storage medium, and the rotational frequency f of the optical storage device is determined according to a frequency generator counting value, the FGCNT value, explained as follows. The optical storage device includes a spindle motor for driving and rotating the optical storage medium. When the spindle motor rotates, the optical storage device detects the rotational frequency of the spindle motor using a hall sensor and correspondingly generates an FG signal representing the current rotational frequency. The digital signal processor (DSP) of the optical storage device receives the FG signal and measures the FG signal using a higher frequency clock signal with a frequency $f_{cnt}$ to derive the FGCNT value, the number of periods that the higher frequency clock signal oscillates within one period of the spindle motor. Using the FGCNT value to represent the rotational frequency f is easier for the DSP to calculate, wherein the relationship among the rotational frequency f, the frequency $f_{cnt}$ of the higher frequency clock signal, and the FGCNT value is $$f = \frac{f_{cnt}}{FGCNT}$$

An rearrangement of the above two equations is derived as follows $$\upsilon = \frac{V}{\varepsilon} = \frac{R \times \omega}{\varepsilon} = \frac{2 \times \pi \times R \times f}{\varepsilon} = \frac{2 \times \pi \times R \times f_{cnt}}{\varepsilon \times FGCNT} = \frac{K_v}{FGCNT}$$

wherein the estimation parameter Kv of the channel bit rate υ is defined as follows $$K_v = \frac{2 \times \pi \times R \times f_{cnt}}{\varepsilon} = \frac{2 \times \pi \times \sqrt{r_i^2 + \frac{p \times L}{\pi}} \times f_{cnt}}{\varepsilon}$$

Therefore, for each data recording location L, the estimation parameter Kv can be derived from the above calculation with the parameters for the CD and the DVD provided in the two aforementioned examples.

The initial set up of the optical storage device is to first create a one-dimensional estimation parameter table (ex. the table 102 in FIG. 1) including a plurality of estimation parameters Kv corresponding to a plurality of data recording location L, wherein the plurality of estimation parameters Kv are calculated using the equations introduced above. The one-dimensional estimation parameter table is stored in a firmware of the optical storage device in advance. When the firmware is executed, an estimation parameter Kv out of the plurality of estimation parameters of the one-dimensional estimation parameter table is rapidly determined according to the data recording location L. The determined estimation parameter Kv is divided by the FGCNT value to rapidly estimate the channel bit rate υ. Through instant estimation of the channel bit rate υ, the optical storage device can complete parameter settings corresponding to the data recording location L in advance when performing data seek of the optical storage medium so that the performance of the optical storage device is enhanced. For example, the VCO-DAC setting of a voltage-controlled oscillator (VCO) of a phase-locked loop (PLL) of the optical storage device requires instant rapid estimation of the channel bit rate υ and the input voltage of the VCO of the PLL will be set as a voltage corresponding to the estimated channel bit rate υ. Therefore, when the estimation parameter table is precisely prepared to comply with the accuracy needed for the reading of the optical storage medium by the optical storage device so that the frequency of the clock signal generated by the VCO is very close to a current channel bit rate, the PLL can rapidly lock onto the current channel bit rate to allow the best performance of the PLL.

Please refer to FIG. 1 illustrating the first embodiment. FIG. 1 is a diagram of a model used for a method of estimation parameter adjustment of an optical storage device according to the first embodiment of the present invention.

In this embodiment, the optical storage device for accessing an optical storage medium is a CD drive, and the optical storage medium is a CD. As previously described, the data recording location L of the CD is defined in units of seconds. The CD drive in FIG. 1 is designed with the track length of the CD per second assumed to be 1.3 m. That is, the linear velocity for data recording is 1.3 m/sec. At the $T^{th}$ second, which is the "address time" shown in FIG. 1, the data recording location L is 1.3 T. FIG. 1 illustrates the above-mentioned one-dimensional estimation parameter table 102 including the plurality of estimation parameters K0, K1, K2, K3, . . . , Kn, wherein the estimation parameters correspond to the address times. When the firmware of the optical storage device is executed, the estimation parameter Kj out of the plurality of estimation parameters K0, K1, K2, K3, . . . , Kn is rapidly determined to be the estimation parameter 110, which is labeled as $K_{V1.3}$ in FIG. 1, according to the data recording location L, which is the current address time 101 shown in FIG. 1, and then the estimation parameter $K_{V1.3}$ is available for frequency estimation 150. The subscript V1.3 of the estimation parameter $K_{V1.3}$ denotes that the one-dimensional estimation parameter table is created with an assumption that the linear velocity of data recording of the optical storage medium accessed by the optical storage device is 1.3 m/sec. The frequency estimation 150 shown in FIG. 1 generates the FGCNT value according to the FG signal sent from the integrated circuit (IC) 170, which includes the aforementioned DSP and PLL, and then the estimation parameter 110 is divided by the FGCNT value to rapidly determine the channel bit rate υ.

As mentioned, the one-dimensional estimation parameter table of the optical storage device according to the first embodiment is designed with the assumption that the linear velocity of data recording of the optical storage medium is constant. That is, the track length per second on the optical storage medium is constant. According to the CD specifications, the linear velocity of data recording ranges from 1.2 m/sec to 1.4 m/sec. Therefore, regarding a CD of the median linear velocity, 1.3 m/sec, the optical storage device according to the first embodiment will work properly using the estimation parameter table.

Figure 2:
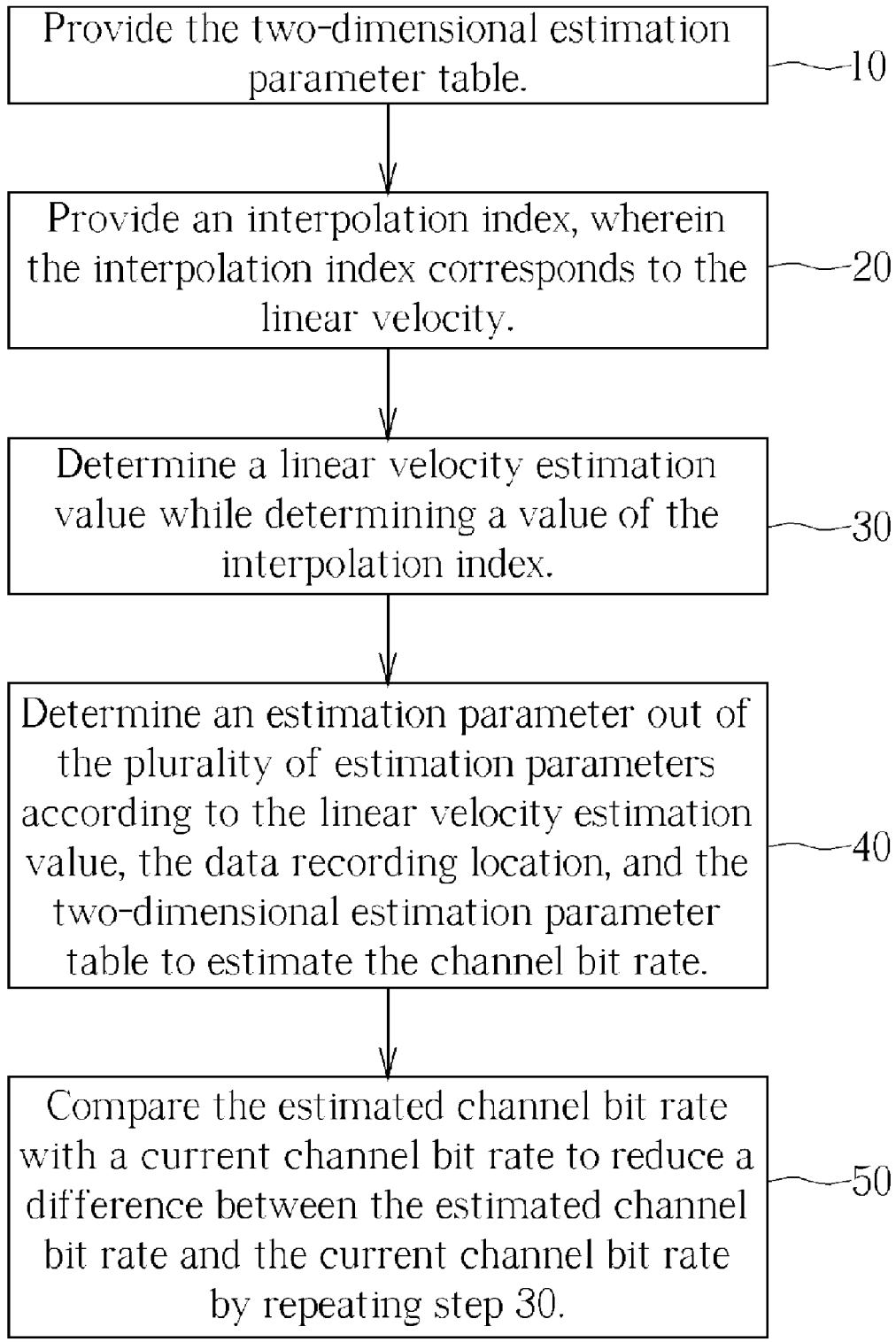
FIG. 2 is a flowchart of a method of estimation parameter adaptability adjustment of an optical storage device according to one embodiment of the present invention.
Figure 3:
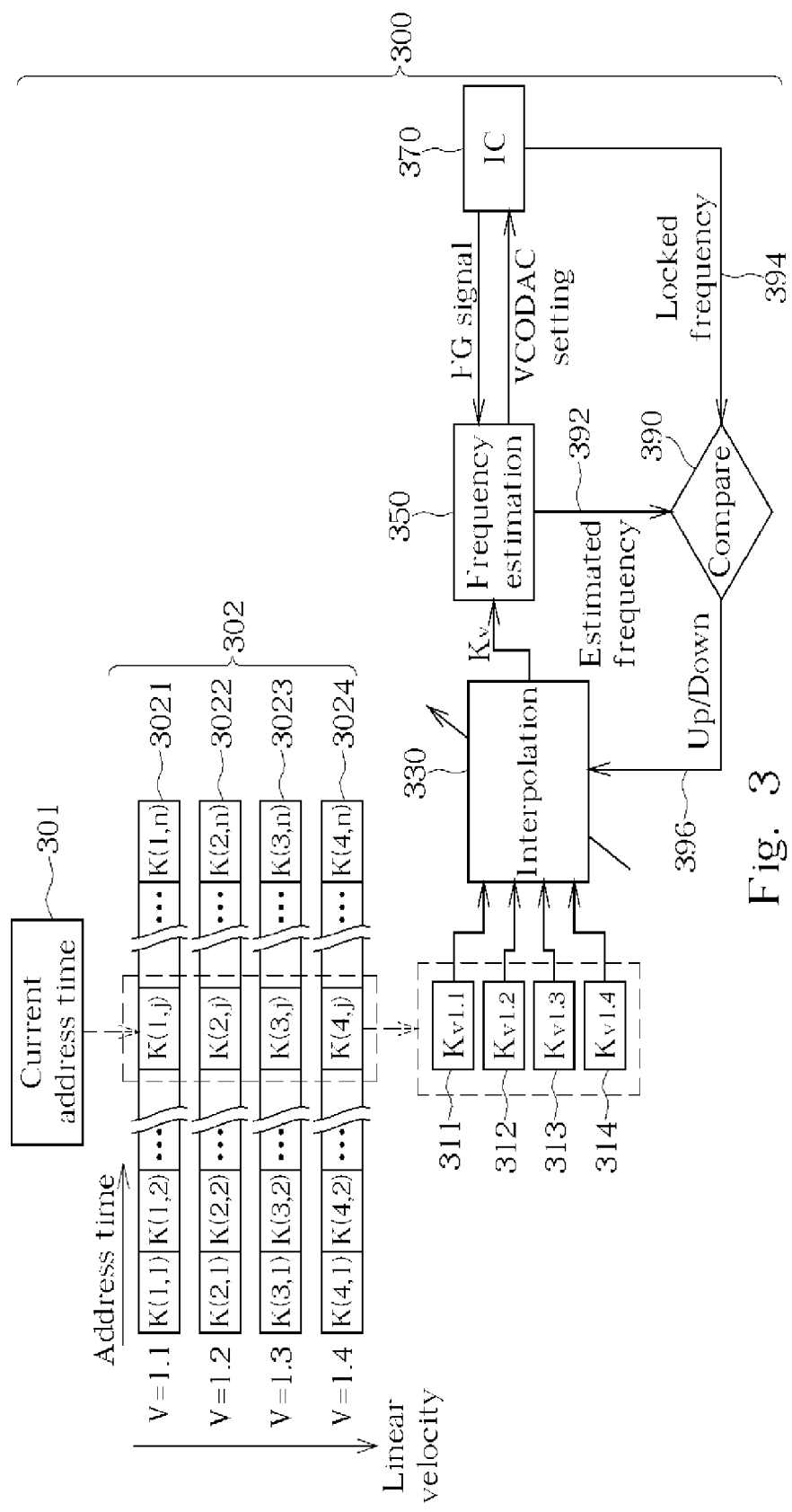
FIG. 3 is a diagram of a model used for the method shown in FIG. 2.

Please refer to FIGS. 2 and 3 at the same time. FIG. 2 is a flowchart of a method of estimation parameter adaptability adjustment of an optical storage device according to one embodiment of the present invention. FIG. 3 is a diagram of a model used for the method shown in FIG. 2. The optical storage device according to the second embodiment of the present invention has a two-dimensional estimation parameter table 302 including estimation parameters K(i, j) (i=1, 2, 3, 4; j=1, 2, 3, 4, . . . , n) derived from the aforementioned equations during a design phase. In this embodiment, the optical storage device for accessing an optical storage medium is a CD drive, and the optical storage medium is a CD. The two-dimensional estimation parameter table 302 is stored in a firmware of the optical storage device in advance. The optical storage device according to the second embodiment is designed for an optical storage medium with inconstant linear velocity of data recording and for an optical storage medium with non-typical linear velocity that is far from the median linear velocity, 1.3 m/sec. This optical storage device is even suitable a certain optical storage medium with larger capacity, longer recording time, and linear velocity of 1.1 m/sec. The related steps of the method is executed by the firmware of the optical storage device (a CD drive in this embodiment) for determining an estimation parameter according to a current data recording location of an optical storage medium accessed by the optical storage device to estimate the channel bit rate. The method is described as follows:

Step 10: Provide the two-dimensional estimation parameter table 302, wherein the two-dimensional estimation parameter table 302 includes the plurality of estimation parameters K(i, j) (i=1, 2, 3, 4; j=1, 2, 3, 4, . . . , n). The estimation parameters K(i, j) correspond to the linear velocity V (such as V=1.1, 1.2, 1.3, 1.4) corresponding to i=1, 2, 3, 4 respectively. The estimation parameters K(i, j) further correspond to the data recording location, which is labeles as "address time" in FIG. 3, respectively corresponding to j=1, 2, 3, 4 . . . , n.

Step 20: Provide an interpolation index to determine an estimation parameter Kv out of the plurality of estimation parameters K(i, j) using an interpolation operation 330 with respect to the interpolation index to estimate the channel bit rate as the frequency estimation 350 shown in FIG. 3 performs, wherein the interpolation index corresponds to the linear velocity V.

Step 30: Determine a linear velocity estimation value V_est (Vest=1.1~1.4) for looking up along the linear velocity V, which is an axis illustrated with the two-dimensional estimation parameter table 302 in FIG. 3, while determining a value of the interpolation index to determine the linear velocity estimation value V_est simultaneously.

Step 40: Determine an estimation parameter Kv out of the estimation parameters K(i, j) according to the linear velocity estimation value V_est, the data recording location, which is labeled as "current address time" 301 in FIG. 3, and the two-dimensional estimation parameter table 302 to estimate the channel bit rate. As shown in FIG. 3, the estimation parameters K(1, j), K(2, j), K(3, j), K(4, j) corresponding to the current address time 301 respectively are selected from the two-dimensional estimation parameter table 302 and are considered to be the estimation parameters $K_{V1.1}$, $K_{V1.2}$, $K_{V1.3}$, $K_{V1.4}$ respectively so that the estimation parameter Kv is derived from the interpolation operation 330.

Step 50: Compare the estimated channel bit rate, which is labeled as "Estimated frequency 392" in FIG. 3, with a current channel bit rate, which is labeled as "Locked frequency 394", to reduce a difference between the estimated channel bit rate and the current channel bit rate by repeating step 30. As shown in FIG. 3, according to the comparison output, "up/down 396" of the comparing operation 390, the interpolation index is increased or decreased accordingly to reduce the difference between the estimated channel bit rate 392 and the current channel bit rate 394.

As mentioned above, the data recording location L for data recording on the CD is defined in units of seconds. The optical storage device shown in FIG. 3 is designed with an assumption that the track length per second of the CD ranges from 1.1 m to 1.4 m. That is, the linear velocity of data recording ranges from 1.1 m/sec to 1.4 m/sec. Therefore for the $T^{th}$ second, the data recording location L, which is labeled as the "address time" in FIG. 3, ranges from 1.1 T to 1.4 T.

As shown in FIG. 3, the two-dimensional estimation parameter table 302 provided in step 10 includes a plurality of one-dimensional estimation parameter tables 3021, 3022, 3023, 3024. When the firmware of the optical storage device is executed, the estimation parameters K(1, j), K(2, j), K(3, j), K(4, j) out of the plurality of one-dimensional estimation parameter tables 3021, 3022, 3023, 3024 respectively are rapidly selected from the two-dimensional estimation parameter table 302. The estimation parameters K(1, j), K(2, j), K(3, j), K(4, j) are considered to be the estimation parameters 311, 312, 313, 314 (i.e. $K_{V1.1}$, $K_{V1.2}$, $K_{V1.3}$, $K_{V1.4}$) provided for the interpolation operation 330 generating the estimation parameter Kv for the frequency estimation 350. Similarly, the subscript V1.3 of the estimation parameter $K_{V1.3}$ denotes that the one-dimensional estimation parameter table 3023 is created with an assumption that the linear velocity of data recording of the optical storage medium accessed by the optical storage device is 1.3 m/sec. Therefore, the subscripts V1.1, V1.2, V1.3, and V1.4 correspond to the linear velocity of 1.1 m/sec, 1.2 m/sec, 1.3 m/sec, and 1.4 m/sec, respectively.

In step 20, hexadecimal values 0xff, 0xaa, 0x55, and 0x00 ("0x" is a hexadecimal notation known in the art) of the interpolation index respectively correspond to the linear velocity of 1.1 m/sec, 1.2 m/sec, 1.3 m/sec, and 1.4 m/sec. In this embodiment, Step 30 can be repeated. When first executing step 30, the linear velocity estimation value V_est can be initially determined to be 1.3 m/sec while determining a value 0x55 of the interpolation index. Regarding the loop of the interpolation operation 330, the frequency estimation 350, and the comparing operation 390, as the linear velocity estimation value V_est initially determined in step 30 is an initial status of the loop, repeated operations of steps 30, 40, and 50 will make the estimated channel bit rate 392 close to the current channel bit rate 394.

Figure 4:
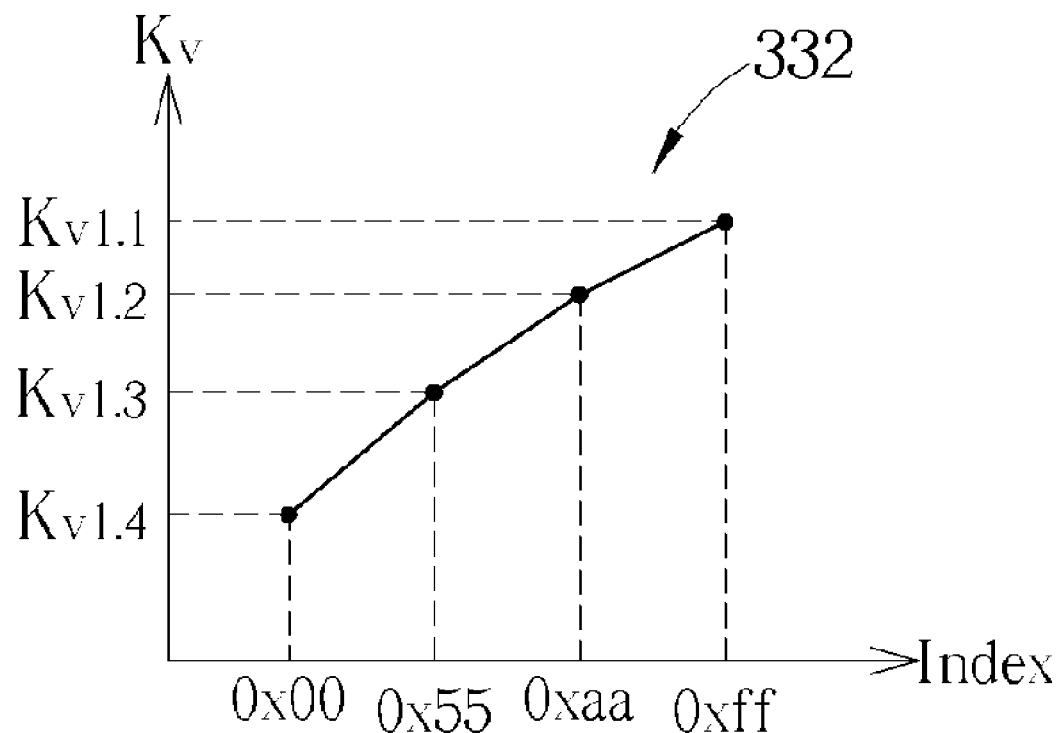
FIG. 4 is an operational diagram of the interpolation operation shown in FIG. 3.

Please refer to FIG. 4 illustrating an operational diagram of the interpolation operation 330 shown in FIG. 3. The horizontal axis denotes the interpolation index, which is labeled as "index" in FIG. 4, and the vertical axis denotes the estimation parameter Kv shown in FIG. 3. The interpolation function 332 shown in FIG. 4 illustrates that the estimation parameters $K_{V1.1}$, $K_{V1.2}$, $K_{V1.3}$, and $K_{V1.4}$ respectively correspond to the hexadecimal values 0xff, 0xaa, 0x55, and 0x00 of the interpolation index. In this embodiment, the interpolation index ranges from the hexadecimal value 0x00 to the hexadecimal value 0xff, wherein substituting a value of the interpolation index into the interpolation function 332 generates the corresponding estimation parameter Kv. During the repeated operations of steps 30, 40, and 50, the firmware receives the FGCNT value derived from the FG signal received from the IC 370, which includes the aforementioned DSP and PLL. The estimation parameter Kv is then divided by the FGCNT value to generate the estimated channel bit rate 392. The comparing operation 390 compares the estimated channel bit rate 392 and the current channel bit rate 394 to determine if the interpolation index should be increased or decreased according to the comparison output, up/down 396, of the comparing operation 390. If the firmware finds that the estimated channel bit rate 392 is less than the current channel bit rate 394, the interpolation index is increased according to the comparison output 396 to decrease the linear velocity estimation value V_est. If the firmware finds that the estimated channel bit rate 392 is more than the current channel bit rate 394, the interpolation index is decreased according to the comparison output 396 to increase the linear velocity estimation value V_est.

According to the deduction of the previous formulas, the rotational frequency f is dependent on the FGCNT value. The method of the present invention further includes determining the current rotational frequency f according to the FGCNT value. It is a design choice of the implementation of the present invention. In another embodiment of the present invention, the firmware may utilize a replacement circuit to derive the rotational frequency f represented by the FG signal, wherein the estimation parameters are obtained by the mathematical calculations of the replacement circuit. Therefore the method of the present invention further includes estimating the channel bit rate v according to the current rotational frequency f and the estimation parameter Kv determined in step 40.

In step 50, the comparing operation 390 compares the estimated channel bit rate 392 with the current channel bit rate 394 to reduce the difference between the estimated channel bit rate 392 and the current channel bit rate 394 by repeating step 30. This is a design choice of the implementation of the present invention. The time required for the PLL to lock indicates the accuracy of the estimated channel bit rate. In another embodiment of the present invention, the linear velocity estimation value V_est is re-determined according to frequency locking time, the time required for the PLL to lock. The method of the present invention further includes monitoring the frequency locking time to reduce the difference between the estimated channel bit rate and the current channel bit rate by repeating step 30.

Figure 5:
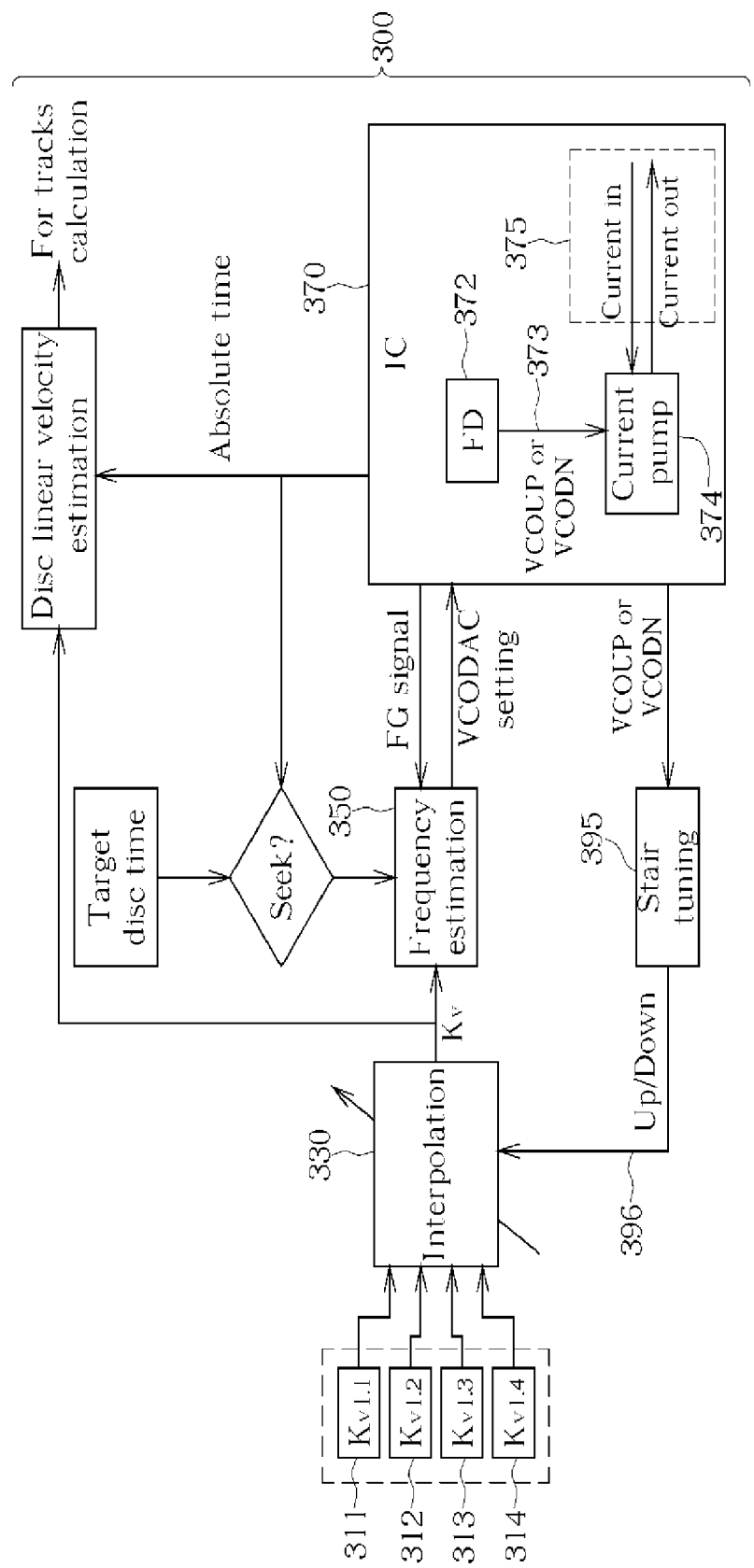
FIG. 5 is a diagram of a model used for a method of estimation parameter adaptability adjustment of an optical storage device according to another embodiment of the present invention.

Within the PLL, there is a current pump 374, which is shown in FIG. 5, for controlling the input voltage of the VCO. By controlling the charge and discharge 375 of the current pump 374, the PLL is capable of controlling the input voltage of the VCO to change the current channel bit rate 394. Therefore, a checking circuit such as an integration circuit (not shown in FIG. 5) is used to check charging and discharging 375 of the current pump 374 or check a logic signal 373 of the current pump 374 to detect the difference between the estimated channel bit rate 392 and the current channel bit rate 394. If the estimated channel bit rate 392 is less than the current channel bit rate 394, the PLL controls the current pump 374 to charge to increase the channel bit rate. If the estimated channel bit rate 392 is more than the current channel bit rate 394, the PLL controls the current pump 374 to discharge to decrease the channel bit rate. Therefore, according to this embodiment, the present invention method may detect the difference between the estimated channel bit rate 392 and the current channel bit rate 394 and re-determine the linear velocity estimation value V_est so that a number of times of charging and discharging 375 of the current pump 374 is reduced. It is a design choice of the implementation of the present invention and is illustrated with FIG. 5. Therefore, the method further includes checking charging and discharging 375 of the current pump 374 of the PLL of the optical storage device to reduce the number of times of charging and discharging 375 of the current pump 374 by adjusting a value of the interpolation index or adjusting the linear velocity estimation value V_est. The method further includes checking a logic signal 373 of a current pump 374 of the PLL of the optical storage device to reduce the number of times of charging and discharging 375 of the current pump 374 by adjusting a value of the interpolation index or adjusting the linear velocity estimation value V_est.

An advantage of the present invention is that the two-dimensional estimation parameter table is designed according to the plurality of linear velocities of data recording and the data recording locations so that the estimation parameters of the two-dimensional estimation parameter table comply with the accuracy needed for different optical storage media being read at different linear velocities of data recording by the optical storage device. As a result, the frequency of the clock signal generated by the VCO of the optical storage device may approach to the current channel bit rate so that the PLL within the optical storage device can instantly lock onto the current channel bit rate to release the full potential of the PLL. On the other hand, after a seeking operation, the time that an IC of the optical storage device locks on the channel bit rate is reduced.

Another advantage of the present invention is that the two-dimensional estimation parameter table is designed according to the plurality of linear velocities of data recording and the data recording locations so that the estimation parameters of the two-dimensional estimation parameter table can compensate for the accuracy needed for some optical storage media having comparatively larger linear velocity deviations of data recording.

Another advantage of the present invention is that the present invention creates in advance the estimation parameter table having an adaptability adjustment function using the plurality of estimation parameters derived from complex mathematical calculations corresponding to the adaptability of the optical storage device with respect to the optical storage media. Therefore, when the optical storage device is in operation, parameter settings related to the channel bit rate is instantly obtained along with enough information to perform adaptability adjustment to enhance the performance of the optical storage device.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of estimation parameter adaptability adjustment of an optical storage device for determining an estimation parameter according to a current data recording location of the optical storage device to estimate a channel bit rate, the method comprising:
    (a) providing an estimation parameter table, wherein the estimation parameter table includes a plurality of estimation parameters corresponding to data recording locations; and
    (b) determining the estimation parameter according to the current data recording locations and the estimation parameter table to estimate the channel bit rate.

2. The method of claim 1, further comprising:
    estimating the channel bit rate according to a current rotational frequency and the estimation parameter determined in step (b).

3. The method of claim 2, further comprising:
    determining the current rotational frequency according to a frequency generator counting value, the FGCNT value.

4. The method of claim 1, wherein the estimation parameter table is a two-dimensional estimation parameter table and the plurality of estimation parameters correspond to linear velocities and the data recording locations, the method further comprising:
    (c) determining a linear velocity estimation value;
    wherein step (b) determines the estimation parameter according to the linear velocity estimation value.

5. The method of claim 4 further comprising:
    (d) providing an interpolation index; and
    (e) determining a value of the interpolation index;
    wherein step (b) determines the estimation parameter using an interpolation operation with respect to the interpolation index.

6. The method of claim 5 further comprising:
    comparing the estimated channel bit rate with a current channel bit rate to reduce a difference between the estimated channel bit rate and the current channel bit rate by repeating step (e).

7. The method of claim 5 further comprising:
    monitoring frequency locking time to reduce a difference between the estimated channel bit rate and a current channel bit rate by repeating step (e).

8. The method of claim 4 further comprising:
    comparing the estimated channel bit rate with a current channel bit rate to reduce a difference between the estimated channel bit rate and the current channel bit rate by repeating step (c).

9. The method of claim 4 further comprising:
    monitoring frequency locking time to reduce a difference between the estimated channel bit rate and a current channel bit rate by repeating step (c).

10. The method of claim 4, wherein step (b) determines the estimation parameter using an interpolation operation with respect to an interpolation index, the method further comprising:
    checking charging and discharging of a current pump of a phase-locked loop of the optical storage device to reduce a number of times of charging and discharging of the current pump by adjusting a value of the interpolation index.

11. The method of claim 4 further comprising:
    checking charging and discharging of a current pump of a phase-locked loop of the optical storage device to reduce a number of times of charging and discharging of the current pump by adjusting the linear velocity estimation value.

12. The method of claim 4, wherein step (b) determines the estimation parameter using an interpolation operation with respect to an interpolation index, the method further comprising:
    checking a logic signal of a current pump of a phase-locked loop of the optical storage device to reduce a number of times of charging and discharging of the current pump by adjusting a value of the interpolation index.

13. The method of claim 4 further comprising:
    checking a logic signal of a current pump of a phase-locked loop of the optical storage device to reduce a number of times of charging and discharging of the current pump by adjusting the linear velocity estimation value.

14. The method of claim 1, wherein the optical storage device is a CD drive or a CD burner, the method further comprising:
    representing the data recording locations using a plurality of address times of a CD.

15. The method of claim 1, wherein the optical storage device is a DVD drive or a DVD burner, the method further comprising:
    representing the data recording locations using a plurality of sectors of a DVD.

* * * * *